July 30, 1940.  C. H. GRIFFITH  2,209,817
AIR INTAKE DEVICE FOR PASSENGER VEHICLES
Filed Oct. 24, 1938
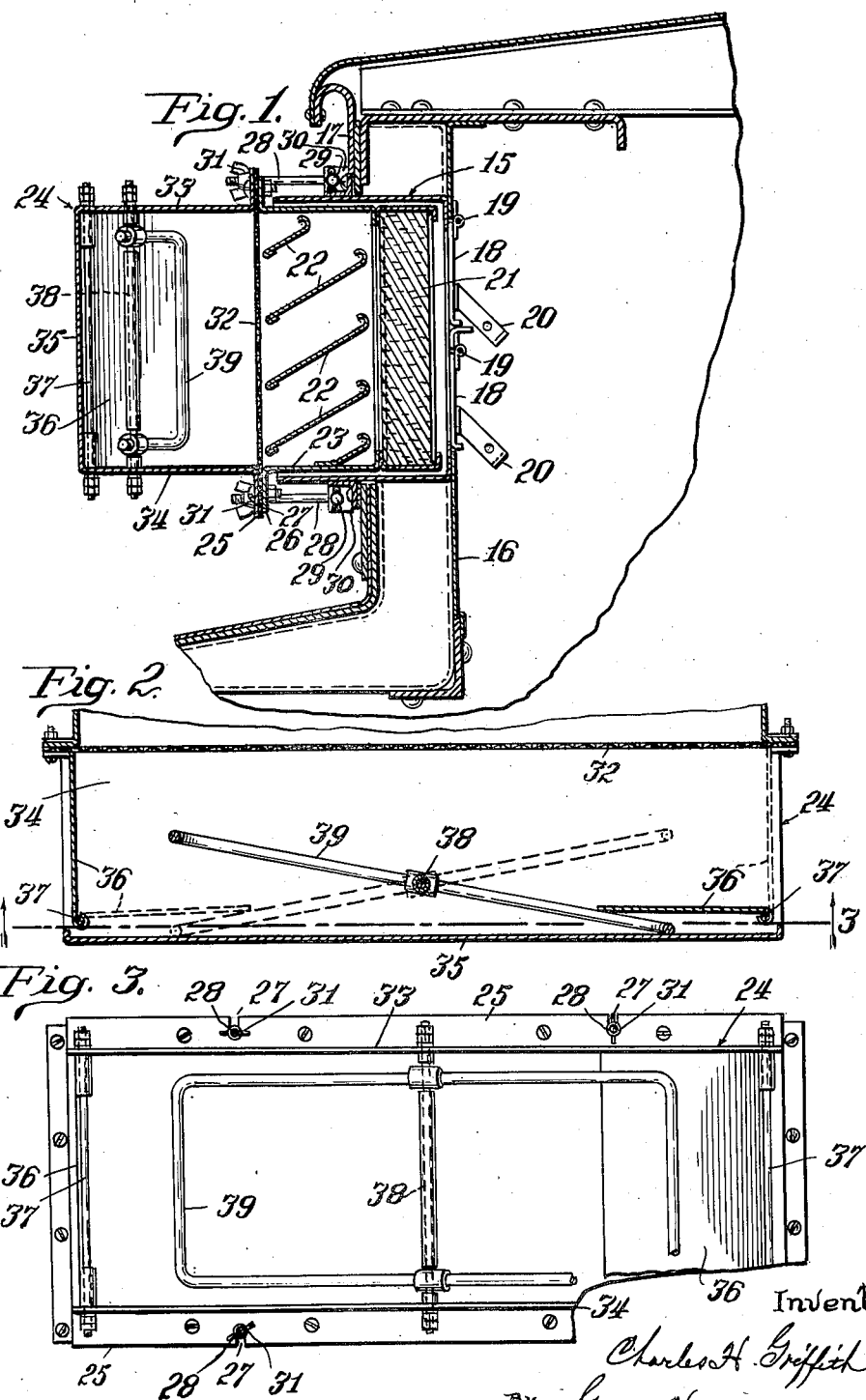

Patented July 30, 1940

2,209,817

UNITED STATES PATENT OFFICE 2,209,817

AIR INTAKE DEVICE FOR PASSENGER VEHICLES

Charles H. Griffith, Parsons, Kans.

Application October 24, 1938, Serial No. 236,705

2 Claims. (Cl. 98—13)

My invention relates to devices more especially intended for railway passenger cars and to be used more particularly in connection with air conditioning systems of railway passenger cars.

The invention has for its object the provision of a device which is automatically operable by the outer air currents encountered during movement of the vehicle or car and is adapted to provide a positive supply of outside air to the car interior or passenger carrying vehicle.

The invention also has for its object the provision of a device of the character mentioned which is readily adaptable to any existing outside air intake located on the outer surface of the car or exterior of the vehicle and which may be used in connection with present day ventilating and air conditioning equipment employed in railroad passenger cars.

The objects and advantages of my invention will all be more readily comprehended from the detailed description of the exemplifications disclosed in the accompanying drawing, wherein—

Figure 1 is a transverse sectional view of the upper or deck portion of a railroad passenger car shown provided with an air intake to which one form of my device is shown applied and which in turn is also shown in vertical section.

Figure 2 is a longitudinal or horizontal sectional view of the intake device shown in Figure 1.

Figure 3 is a vertical sectional view taken on the line 3—3 of Figure 2 looking in the direction of the arrows, with a portion broken away.

My invention, which may be employed with any moving vehicle, is especially adapted to railroad passenger cars and for purposes of exemplification has been shown applied to an air intake located in the upper part or side deck portion of a rialroad passenger car of which a portion is shown in section; the air intake, which is of well known construction, consists of a suitable housing 15 connected with inner wall 16 of the car and extending through the outer wall 17; the opening at the interior of the car being usually provided with suitable dampers 18, 18 pivotally connected at 19 and manually controlled from the car interior by suitable mechanism, of which only a portion is shown at 20. This housing may be provided with suitable filtering mechanism as at 21 and with a plurality of louvers, as at 22, for elimination of water from the incoming air currents; the filter mechanism and louvers being shown as preferably mounted in a separate casing 23 inserted in the housing 15.

The mechanism just described is of a type at present in use and forms no part of my invention.

The form of air intake device, disclosed in the first three figures of the drawing, comprises a suitable housing 24, which may be of sheet metal or other suitable composition and of cross sectional configuration corresponding to the outer end of the casing 23 to which it preferably is removably secured. The casing 24 is flanged at 25 to substantially correspond with the outwardly flanged portion 26 of the casing 23; the flanges 25 and 26 preferably being transversely slotted as at 27, see Figure 3, to receive the ends of the pivoted links or bolts 28 whose inner ends are trunnioned at 29 to brackets 30 secured to casing 15 or on the car exterior; while the outer ends of the links or bolts are threaded to receive the butterfly nuts 31 whereby the casings 23 and 24, with a screen element 32 therebetween, may be firmly clamped against the outer perimeter of housing 15.

The casing 24, shown of rectangular cross-section, consists of a top wall 33, a bottom wall 34 and an outer side wall 35, while the two ends of the casing are open to atmosphere. Each end of the casing 24 is provided with a shutter 36 pivoted at the end adjacent outer side wall 35 by a vertically disposed pivot 37 to permit the shutter to swing through a horizontally disposed arc in a direction away from the inner or screen side of the casing. The shutters are coextensive with the open ends of the casing 24 so as to provide complete closures therefor.

The casing 24, intermediate of its ends and in proximity to the outer wall 35, is provided with a vertically disposed rod 38 on which a suitable frame 39 is pivotally mounted to oscillate horizontally; the frame 39 being in the nature of a rod bent into the rectangular form more clearly shown in Figure 3 with the end portions disposed beyond and into the path of the free ends of the shutters so that the shutters will overlap the ends of the frame 39, as shown in Figure 2, when the shutters are in open position.

With the structure shown in Figures 1 to 3, mounted adjacent the air opening of the car, the ends of the casing 24 will be disposed in the direction of travel of the car, so that when the car moves to the right in Figure 2 the wind or air pressure on the car exterior will cause the shutter 36 at the right of Figure 2 to move to complete open position and into overlapping relation with the adjacent end of the frame 39, as shown in full lines. Such movement of the shutter will cause frame 39 to tilt from the dotted line position in Figure 2 to the full line position thereby causing the left hand end of the frame to tilt toward the wall of the car as shown in full lines which in turn forces the shutter 36 at the left toward closing position where the inrushing air from the right hand end of the casing will induce complete closure of the shutter 36 at the left. As a result, all of the air flowing in through the right hand open end will be made to flow through the opening in the car, provided, of course, that the dampers 18 on the car interior have been moved to open position.

It is apparent that if the car is moved in the opposite direction, namely to the left in Figure 2, the operation of the mechanism will be reversed and frame 39 will be tilted to the dotted line position in Figure 2, thereby moving shutter 36 at the right into position where the inrushing air from the left end will cause its complete closure. As is apparent from this construction, the device automatically adjusts itself to the outer air pressures and causes a positive flow of fresh air into the car.

It will be readily understood that my improved air intake device may be located at any suitable point on the car or vehicle with its inlet openings generally disposed in the directions of travel; the inlet openings being controlled by self adjusting shutters which will cause the entrapped air to flow into the car without permitting an eduction or exhausting action to be created as, however, is the case with existing types of air intake housings during certain speeds, resulting from the slip stream action of the air across the face of the inlet of the housing.

I have disclosed my invention as applied to the air intake arranged in the upper part of a railroad passenger car, but it will be understood that the point of application, with or without air filtering and conditioning means, as well as the structural configuration may be altered without, however, departing from the spirit of my invention.

What I claim is:

1. An air intake device of the character described comprising a housing adapted to be secured on the exterior of a railroad passenger car and provided with air inlets disposed substantially in the direction of travel of the car and having an outlet opening in one side wall communicating with the car interior; vertically disposed closure members for said inlets pivotally mounted within the housing to move inwardly into open position through the action of external air pressure; and means whereby the free ends of the closure members are so positioned that when the closure member at one end is opened the free end of the closure member at the other end of the housing will be forced into the path of the inrushing air and thereby moved to closed position and the entrapped air caused to flow through the outlet opening to the car interior.

2. An air intake device of the character described comprising an elongated housing provided with top, bottom and side walls, adapted to be secured to the exterior of a passenger car with the ends of the housing disposed in the direction of movement of the car, one side of the housing having an outlet opening communicating with the car interior while the outer vertical sides of the housing on opposite sides of its transverse median line are provided with inlet openings; closure members pivoted at their ends adjacent the inlet openings to swing inwardly by external air pressure; and independent means pivoted intermediate its ends and arranged in the housing intermediate of the paths of the free ends of the closure members so as to be tilted when the free end of the closure member at one end of the housing moves to open position and engages said means thereby tilting the latter and forcing the closure member at the opposite end of the housing into the path of the inrushing air and causing the last mentioned closure member to move to complete closed position, whereby the entrapped air is made to flow through the outlet opening.

CHARLES H. GRIFFITH.